United States Patent Office 2,847,644
Patented Aug. 12, 1958

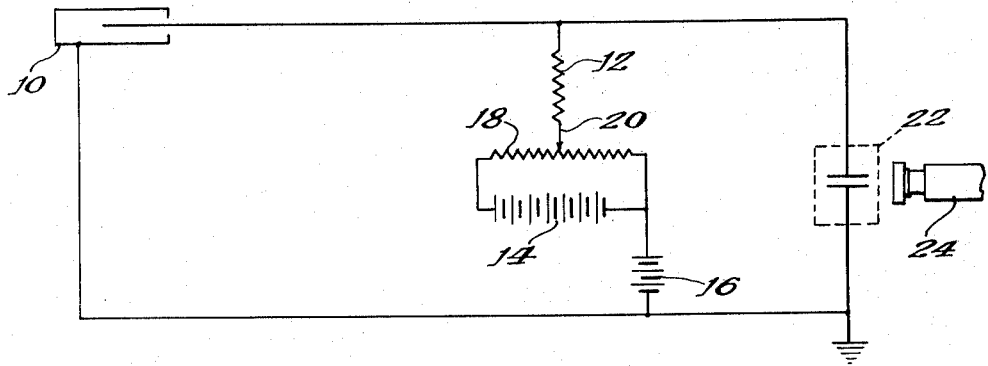
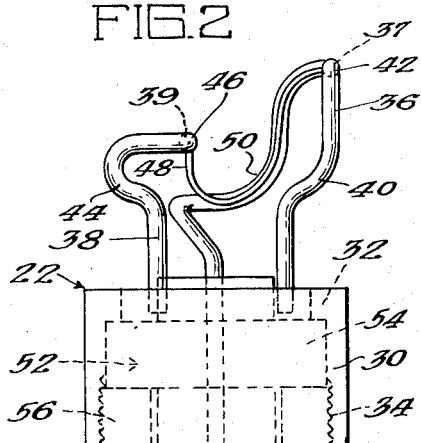
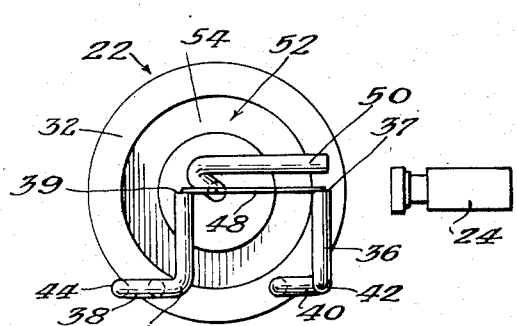
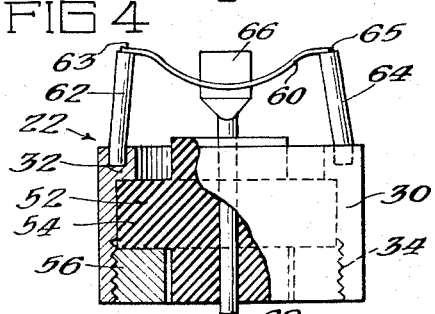
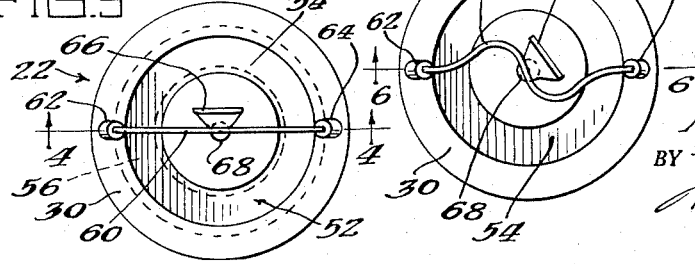

2,847,644

HIGH SENSITIVITY ELECTROSCOPE

Francis R. Shonka, Riverside, and Anthony J. Okleshen, Lemont, Ill., assignors to the United States of America as represented by the United States Atomic Energy Commission Application April 14, 1954, Serial No. 423,264

5 Claims. (Cl. 324—109)

The present invention relates to an electrometer having high sensitivity and stable operation.

In recent years, the electrometer art has developed rather rapidly due to applications for electrometers in radiation measuring instruments, among others. The early electrometers made use of foils attached together, or a fiber suspended at one end close to a deflecting member. It was subsequently found that the electrometer would exhibit greater stability with some loss in sensitivity if both of the ends of the electrometer were affixed to a support. Such an electrometer is disclosed in the patent to Landsverk and Wollan, No. 2,465,886, issued March 29, 1949. These latter electrometers have great utility in measuring electrostatic charges when high sensitivity is not required, but it becomes increasingly difficult to use electrometers of this type when the sensitivity requirements are increased. Hence, it is an object of the present invention to provide an electrometer which combines the stable operating characteristics of the Landsverk and Wollan electrometer with high sensitivity.

The electrometers heretofore constructed have been delicate instruments and have required precision workmanship. It is a further object of the present invention to provide an electrometer which will not require careful machine work or delicate assembly operations.

Further objects and advantages of the present invention will be readily apparent to the man skilled in the art from a reading of the present specification, especially when considered in the light of the drawings, in which:

Figure 1 is a schematic circuit diagram of a radiation measuring instrument utilizing an electrometer;

Figure 2 is an elevational view of one embodiment of the electrometer constructed in accordance with the teachings of the present invention;

Figure 3 is a plan view of the embodiment shown in Figure 2;

Figure 4 is an elevational view showing an electrometer which constitutes a second embodiment of the present invention;

Figure 5 is a plan view of the electrometer shown in Figure 4;

Figure 6 is an elevational view of another electrometer; and

Figure 7 is a plan view of the electrometer shown in Figure 6.

Figure 1 shows a schematic circuit diagram of a device which may utilize an electrometer of the type herein disclosed, and which is suitable for measuring the rate of radiation exposure to which an object is subjected. The circuit uses an ionization chamber 10 connected in parallel with an electrometer 22. Also connected in parallel with the electrometer 22 is a series circuit consisting of a high impedance 12, a portion of a battery 14 which is tapped from the battery 14 by a voltage divider 18, and another battery 16. The batteries 14 and 16 are connected to add potentials and place a large charge upon the ionization chamber 10. An optical system 24, shown schematically, is used to view the electrometer 22 and to determine the amount of deflection of the electrometer 22. The ionization chamber 10 is charged by the combined voltages of battery 16 and the voltage appearing across the portion of the voltage divider 18 from the tap 20 to battery 16. It will be noted, that the voltage drop across the voltage divider 18 is provided by the current flowing through the voltage divider 18 as a result of battery 14. Radiation impinging upon the ionization chamber 10 will cause a current to flow through resistor 12 and a portion of the voltage divider 18, thus developing a potential drop primarily across resistor 12 that opposes the potential drop across the portion of voltage divider 18 and battery 16. This causes the electrometer 22 to indicate a decrease in the charge placed upon it. However, when radiation ceases to impinge upon the ionization chamber 10, this potential difference across resistor 12 will disappear, and the electrometer 22 will be restored to its former state of charge as a result of the current flowing through battery 16 and the portion of the voltage divider 18 between the tap 20 and battery 16. In this manner, the device shown in Figure 1 may be used to indicate the rate of exposure that an object will receive if placed at the location of the ionization chamber 10.

The electrometer 22 must be very sensitive because of the small potential difference appearing across resistor 12. The electrometer shown in Figures 2 and 3 is suitable to be used for the electrometer 22 in the device shown in Figure 1. The electrometer 22 has a cylindrical base 30 provided with a flange 32 at one end and threads 34 at the other end. Attached to the flange 32 are a pair of fiber supporting rods 36 and 38 of approximately equal length, also constructed of electrically conducting material. The one rod 36 is provided with an S-shaped permanent bend 40 near its center and a right angle permanent bend 42 near its unsupported extremity 37, the first bend being generally away from the axis of the base 30 and the second bend 42 being generally toward the axis of the base 30. The other supporting rod 38 is provided with a hook-shaped permanent bend 44 near its central portion, and a right angle permanent bend 46 near its extremity 39. These bends orient the portion of the rod 38 between its extremity 39 and right angle bend 46 to be parallel to the corresponding portion of rod 36, and position the extremities 37 and 39 of the rods 36 and 38 on a plane traversing the axis of the base 30. A fiber 48 is normally attached to the extremities 37 and 39 of the rods 36 and 38. The permanent set of fiber 48 is straight and it is provided with two adjacent bends in opposite directions. The bends in the fiber do not exceed the elastic limit of the fiber 48. The fiber is rigidly secured to the extremity 39 of the rod 38 in a direction parallel to the axis of the base 30, while it is rigidly secured to the extremity 37 of the rod 36 in a direction normal to the axis of the base 30, thus providing a fiber which lies in a single plane in the absence of electrostatic forces and is roughly shaped in the form of a J, as shown in Figure 2. It will be noted that one of the bends is approximately 180 degrees while the adjacent bend is approximately 90 degrees.

Adjacent to the fiber 48 is disposed a rod shaped deflecting member 50 which is constructed of electrically conducting material. One end of the deflecting member 50 is mounted on the axis of the base 30 by a cylindrical electrical insulator 52 which is provided with a boss 54 about its periphery. The boss 54 is wedged between the flange 32 on the base 30 and a locking nut 56 threaded into the threads 34 in the base 30, thereby rigidly securing the deflecting member 50 in place. The deflecting member 50 is bent to conform to the shape of that portion of the fiber 48 that is disposed between the two bends in the fiber, and the deflecting member 50 is mounted on a plane roughly parallel to the plane of the uncharged fiber 48 and relatively close to the fiber 48.

The fiber 48 must be electrically conducting and may be a quartz fiber that has been sputtered with silver. The base 30, mounting rods 36 and 38, and deflecting member 50 may be of any rigid electrically conducting material, such as copper or aluminum.

The electrometer 22 may be most readily constructed by mounting rods 36 and 38 on the base 30 and cementing the fiber 48 into place at the extremities 37 and 39 of the rods 36 and 38 before the bend 44 is placed in the rod 38, but after bends 40, 42, and 46 have been made. In this manner bending the hook bend 44 in the rod 38 will provide ample play in the fiber 48 to permit it to take the proper form.

The electrometer shown in Figures 2 and 3 may be used either as a repulsion or as an attraction electrometer depending upon whether the charge to be measured is connected across the base 30 and the deflecting member 50, as in the case of use as an attraction electrometer, or is placed upon both of the two conducting elements, as in the case of a repulsion electrometer. In either event, the fiber 48 will be caused to pivot about an axis traversing the extremities 37 and 39 of the rods 36 and 38, thereby giving a measurement of the charge placed upon it. Most of the deflection will be the result of twisting occurring in the fiber 48, largely in the portions of the fiber adjacent to the extremities 37 and 39 of the rods 36 and 38. Some bending may be expected also to occur in the fiber 48, but since the shear modulus for quartz fiber, as well as other materials, is several times less than Young's modulus for this material, the fiber 48 will twist rather than bend. This results in an electrometer having a much greater sensitivity than one depending upon bending alone. Also, there is no substantial decrease in the mechanical stability of the electrometer, since the fiber is securely attached to the supporting rods 36 and 38 at both ends. It has been found that a suitable length for the fiber 48 when constructed of a 2¼ micron quartz fiber sputtered with silver is 5/16 of an inch, and that rods 36 and 38 may be ½ of an inch long before being bent, the portion of the rods 36 and 38 from the extremities 37 and 39 to the right angle bends 42 and 46 being approximately ⅛ of an inch. Under these conditions, an electrometer may be constructed having a deflection suitable for full scale when placed under a charge of 45 volts and a sensitivity of 1 volt for the full scale. It is to be noted, that the telescope 24 is aligned with the plane of the uncharged fiber 48, as illustrated in Figure 3, and that the telescope 24 may be provided with a scale, not shown, which may be calibrated directly in terms of the quantity being measured.

Another electrometer embodying the principles of the present invention is shown in Figures 4 and 5. It is to be noted that the base 30, flange 32, insulator 52, threads 34 and locking nut 56 are identical with the corresponding elements shown in Figures 2 and 3. In this case, however, a fiber 60 is rigidly affixed to the extremities of two straight rods 62 and 64, the rods 62 and 64 being mounted on the base 30 on a plane through the axis of the base 30. The fiber 60 is provided with three adjacent bends in opposite directions, rather than merely the two bends shown in the embodiment of Figures 2 and 3. The ends of the fiber 60 are rigidly secured to the extremities 63 and 65 of the rods 62 and 64, and are directed normally to the rods 62 and 64. The permanent set of the fiber is straight, and the fiber lies in a single plane in the absence of electrostatic forces. The rods 62 and 64 are slightly inclined to compress the fiber and cause it to form the three bends required. The three bends will only be formed in the fiber 60 if the rods 62 and 64 are inclined at an angle with respect to the axis of the cylindrical base 30 that is less than $$2 \arctan \frac{2P}{L}$$

where P is the length of the rods 62 and 64 above the bends therein, and L is the length of the fiber 60, L also being the distance between the rods 62 and 64 at the base 30. A deflecting member 66 in the form of a plate is disposed adjacent to the center bend in fiber 60 on a plane parallel to the axis of the cylindrical base 30, and is mounted in that position by an electrically conducting wire 68 extending through the insulator 52 on the axis of the cylindrical base 30.

Similar materials may be used to construct this embodiment of the invention as were described with reference to the embodiment of Figures 2 and 3, and similar sensitivity may be expected from this electrometer.

Figures 6 and 7 show another type of electrometer which primarily twists in operation. In this embodiment, the base 30, insulator 52, locking nut 56 and flange 32 are identical with the corresponding elements in the other embodiments. Rods 62 and 64 are mounted upon the base 30 in the same manner as the corresponding parts in the embodiment of Figures 4 and 5. A fiber 70 with a straight permanent set is rigidly affixed to the extremities 63 and 65 of the rods 62 and 64, and is provided with a helical bend of approximately one-half turn. A deflecting plate 72 is positioned adjacent to the center portion of the helical fiber 70 at an angle of approximately 45° with the plane traversing the rods 62 and 64. The plate 72 is constructed of conducting material and attached to a conducting wire 68 which is affixed to the insulator 52 in a manner identical to that shown in Figures 4 and 5.

When a potential difference is applied between the base 30 and the conducting wire 68, the fiber 70 will roll toward the plate 72, and in this manner the force required to twist the fiber 70 will be the most important force to be overcome in deflecting the fiber. As has been explained above, the force required to twist a fiber is less than that required to bend a fiber. Hence, the instrument is more sensitive than those previously used in the art.

This application is a continuation-in-part of application Serial No. 225,635 filed by Francis R. Shonka and Anthony J. Okleshen, entitled "High Sensitivity Electroscope" on May 10, 1951.

It may readily be seen that electrometers have been provided which are simple to construct and are capable of high sensitivities. These electrometers are simple to construct and, hence, it will be possible to supply sensitive electrometers at relatively low cost. The man skilled in the art will readily devise other electrometers within the intended scope of this invention, and hence the scope of the invention should be limited only by the appended claims rather than the foregoing specification.

What is claimed is:

1. An electrometer comprising fiber supporting means having a hollow cylindrical base provided with an inwardly extending flange at one end, a pair of wire-shaped fiber support members of equal length mounted to the flanged end of the base and extending outwardly from the base, the one support member being permanently bent toward the other member, a cylindrical insulator provided with a central aperture and a boss about the periphery thereof disposed within the base, the boss being slidably disposed within the hollow cylindrical base and confronting the flange thereof, a deflecting member mounted within the aperture of the insulator, and a locking nut threaded within the hollow cylindrical base and wedging the boss of the insulator against the flange of the base, and an electrical conducting fiber attached at its ends to the ends of the fiber support members, said fiber being disposed in a single plane in the absence of electrostatic forces and having two adjacent bends in opposite directions, one of said bends being 180° and the other of said bends being 90°, the deflecting member confronting the plane of the fiber between the 180° and 90° bends therein.

2. An electrometer comprising fiber support means, an electrical conducting fiber attached to the supporting means at its ends, said fiber being disposed in a single plane in the absence of electrostatic forces and having two adjacent bends in opposite directions, one of said bents being 180° and the other of said bends being 90°, and means for applying an electrostatic force normal to the fiber disposed adjacent to the fiber.

3. An electrometer comprising, in combination, fiber support means, an electrically conducting fiber totally disposed in a single plane in the absence of electrostatic forces and affixed at both ends to the fiber support means, said fiber being provided with a plurality of adjacent bends in opposite directions, and means for applying an electrostatic force between two adjacent bends of the fiber and normal to the plane thereof.

4. An electrometer comprising the elements of claim 3 wherein the fiber is provided with three adjacent bends in opposite directions.

5. An electrometer comprising the elements of claim 3, the fiber support means comprising a base having an axis, and a pair of posts extending from the base and inclined toward each other at an angle with the axis of the base less than $$2 \arctan \frac{2P}{L}$$

where P is the length of each post extending from the base and L is the distance between the posts at the base.

References Cited in the file of this patent
UNITED STATES PATENTS

| 299,885 | Welsh | June 3, 1884 |
| 540,742 | Keelyn | June 11, 1895 |
| 2,465,886 | Landsverk et al. | Mar. 29, 1949 |
| 2,613,327 | Beckman et al. | Oct. 7, 1952 |

OTHER REFERENCES

Publication I, AECD, 1865, U. S. Atomic Energy Commission Summary Report on the Development of Electrometer Radiation Instruments by O. G. Landsverk and E. O. Wollan. Date of manuscript July 25, 1944. (In Div. 54.)

Publication II, "Procedures in Experimental Physics" by John Strong, published by Prentice-Hall, Inc., N. Y. in 1938, page 230, Fig. 8. (In Div. 54.)